US012790188B2

(12) United States Patent
Komura et al.

(10) Patent No.: US 12,790,188 B2
(45) Date of Patent: Nov. 10, 2026

(54) CONVEYANCE SYSTEM

(71) Applicant: TOYOTA JIDOSHA KABUSHIKI KAISHA, Aichi-ken (JP)

(72) Inventors: Hirotaka Komura, Tokyo-to (JP); Yutaro Takagi, Tokyo-to (JP); Uori Koike, Saitama (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 283 days.

(21) Appl. No.: 18/644,099

(22) Filed: Apr. 24, 2024

(65) Prior Publication Data

US 2024/0367958 A1 Nov. 7, 2024

(30) Foreign Application Priority Data

May 1, 2023 (JP) ................................ 2023-075392

(51) Int. Cl.
*B66F 9/065* (2006.01)
*B66F 9/06* (2006.01)
*B66F 9/18* (2006.01)

(52) U.S. Cl.
CPC .............. *B66F 9/065* (2013.01); *B66F 9/063* (2013.01); *B66F 9/186* (2013.01)

(58) Field of Classification Search
CPC .......... B66F 9/065; B66F 9/063; B66F 9/186; B23Q 7/1426; B60P 1/02; B60P 3/073; B60P 7/06; B62D 33/0207
USPC ............................ 414/280; 296/100.04, 167
See application file for complete search history.

(56) References Cited

U.S. PATENT DOCUMENTS

| | | | | | |
|---|---|---|---|---|---|
| 4,534,546 | A * | 8/1985 | Cattani | B23Q 16/001 | 269/58 |
| 5,785,485 | A * | 7/1998 | Hall | B60P 1/6427 | 414/500 |
| 6,082,956 | A * | 7/2000 | Pentland | B62B 3/06 | 414/498 |
| 6,736,585 | B2 * | 5/2004 | O'Daniel | B65F 3/00 | 410/94 |
| 7,871,234 | B2 * | 1/2011 | Yuyama | B62B 5/0083 | 280/33.997 |
| 10,144,587 | B2 * | 12/2018 | Stubbs | B65G 1/137 | |
| 11,370,614 | B2 * | 6/2022 | Azumi | B65G 17/12 | |

FOREIGN PATENT DOCUMENTS

| | | |
|---|---|---|
| JP | 2021-042047 A | 3/2021 |
| JP | 2022-143307 A | 10/2022 |

* cited by examiner

*Primary Examiner* — Gregory W Adams
(74) *Attorney, Agent, or Firm* — HAUPTMAN HAM, LLP

(57) ABSTRACT

A conveyance system that reduces the risk of a loading platform tipping over during conveyance while the loading platform is lifted by a conveyance vehicle is achieved. A conveyance system according to an embodiment of the present disclosure includes a loading platform including a mounting unit and a conveyance vehicle. The loading platform is conveyed by the conveyance vehicle while the mounting unit is lifted from below by the conveyance vehicle. The loading platform has an abutting part below the mounting unit that abuts a lower surface of the conveyance vehicle when the conveyance vehicle lifts the mounting unit.

6 Claims, 5 Drawing Sheets

CONVEYANCE SYSTEM

CROSS REFERENCE TO RELATED APPLICATIONS

This application is based upon and claims the benefit of priority from Japanese patent application No. 2023-075392, filed on May 1, 2023, the disclosure of which is incorporated herein in its entirety by reference.

BACKGROUND

The present disclosure relates to a conveyance system and, in particular, to a technology for conveying a loading platform.

A conveyance system to lift and convey a loading platform including a mounting unit by a conveyance vehicle is known (e.g., Japanese Unexamined Patent Application Publication No. 2022-143307).

SUMMARY

A loading platform lifted by a conveyance vehicle may tip over.

The present disclosure has been made in view of such a problem, and it is possible to achieve a conveyance system that reduces the risk of a loading platform tipping over during conveyance while the loading platform is lifted by a conveyance vehicle.

An aspect of the present disclosure is a conveyance system comprising:

a loading platform including a mounting unit; and a conveyance vehicle.

The loading platform is conveyed by the conveyance vehicle while the mounting unit is lifted from below by the conveyance vehicle, and the loading platform has an abutting part below the mounting unit that abuts a lower surface of the conveyance vehicle when the conveyance vehicle lifts the mounting unit.

According to the present disclosure, it is possible to achieve a conveyance system that reduces the risk of a loading platform tipping over during conveyance while the loading platform is lifted by a conveyance vehicle.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, a specific embodiment to which the present disclosure is applied will be described in detail with reference to the drawings. However, the present disclosure is not limited to the following embodiment. In addition, for clarity, the following descriptions and drawings have been simplified as appropriate.

First Embodiment

Figure 1:
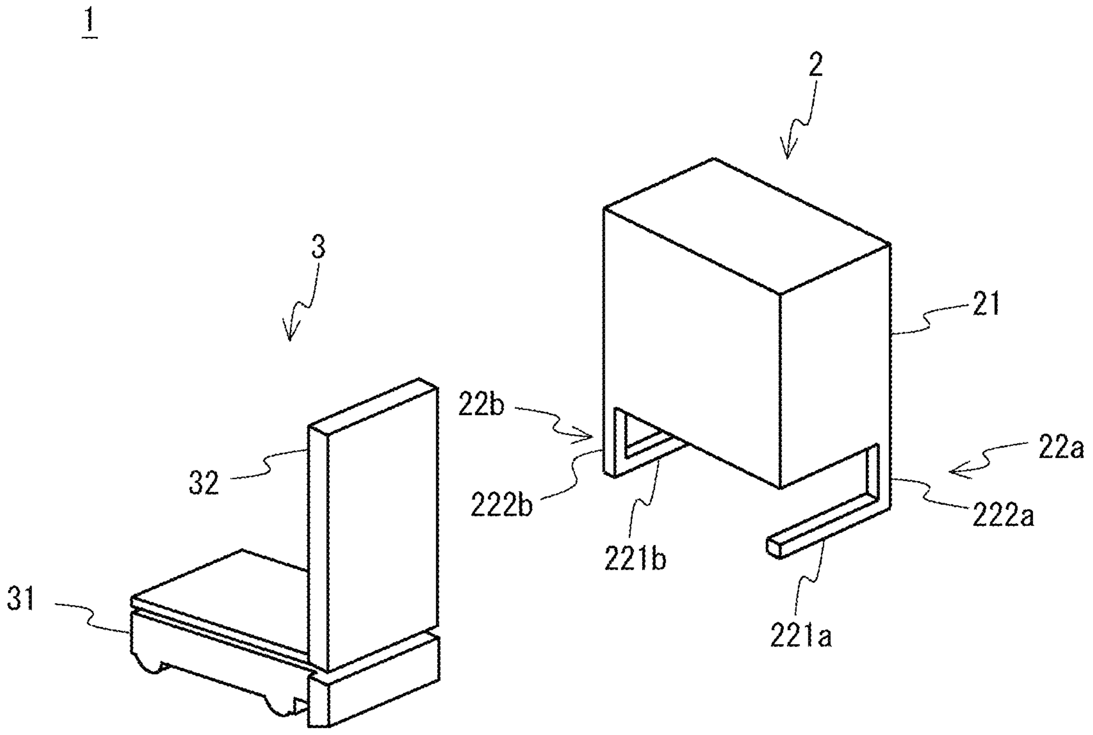
FIG. 1 is a diagram explaining a configuration of a conveyance system according to a first embodiment.

Hereinafter, a conveyance system according to the first embodiment will be described with reference to the drawings. FIG. 1 is a diagram for explaining a configuration of a conveyance system 1 according to the first embodiment. The conveyance system 1 includes a loading platform 2 and a conveyance vehicle 3. The conveyance vehicle 3 may be an unmanned transport vehicle.

The loading platform 2 includes a mounting unit 21, a leg part **22*a*, and a leg part 22*b*. A package is mounted on the mounting unit 21. The leg part 22*a* and leg part 22*b* are provided under the mounting unit 21 and support the mounting unit 21. When the leg parts 22*a* and 22*b* are not distinguished from each other, they may simply be referred to as leg parts 22**.

Note that the loading platform 2 does not need to have both leg parts **22*a* and 22*b*; it may have only one of them. In this case, to enable the loading platform 2 to stand independently, a leg part having a configuration different from that of the leg parts 22** may be provided.

The leg part **22*a* includes a horizontally extending abutting part 221*a* and a vertically extending pole 222*a*. Similarly, the leg part 22*b* includes a horizontally extending abutting part 221*b* and a vertically extending pole 222*b*. If the abutting parts 221*a* and 221*b* are not distinguished from each other, they may simply be referred to as abutting parts 221. Similarly, if the poles 222*a* and 222*b* are not distinguished from each other, they may simply be referred to as poles 222**.

The proximal end, which is one end of the abutting part 221, is connected to the periphery of the lower surface of the mounting unit 21 with the pole 222 interposed therebetween. The end part opposite to the proximal end of the abutting part 221 is referred to as a distal end.

The abutting part 221 is, for example, a rod-shaped body or a plate-like body having a rectangular cross section and extends in the front-rear direction or the width direction of the loading platform 2. The abutting part 221 is arranged so that one side of the above rectangle is aligned with the horizontal direction. When the abutting part 221 is a plate-like body, the long side of the rectangle may be aligned with the horizontal direction. Note that the abutting part 221 may be a rod-shaped body with a circular cross section.

The loading platform 2 may be configured to have a longitudinal direction and a transverse direction in a top view. In this case, the abutting part 221 may extend in the transverse direction of the front-rear direction and the width direction of the loading platform 2. For example, when the width direction of the loading platform 2 is the transverse direction, the abutting part 221 extends in the width direction of the loading platform 2.

In FIG. 1, the direction from the proximal end to the distal end of abutting part **221*a* is opposite to the direction from the proximal end to the distal end of the abutting part 221*b*. The conveyance vehicle 3 can move above the abutting part 221*a* by advancing from the distal end to the proximal end of the abutting part 221*a*. The conveyance vehicle 3 can move above the abutting part 221*b* by advancing from the distal end to the proximal end of the abutting part 221*b***.

As described above, the conveyance vehicle 3 may have only one of the leg parts **22*a* and 22*b*. Further, the direction from the proximal end to the distal end of the abutting part 221***a* may be the same as the direction from the proximal end to the distal end of the abutting part 221*b*. The conveyance vehicle 3 may move above both the abutting part 221*a* and 221*b* by advancing from the distal end to the proximal end of the abutting part 221*a* and the abutting part 221*b*, respectively.

The conveyance vehicle 3 has a main body unit 31. The main body unit 31 is a casing for at least a part of equipment (e.g., processor, actuator) required for the conveyance vehicle 3. A vertically extending plate 32 is erected at an end of the main body unit 31. A sensor (e.g., LIDAR) not shown may be attached to the plate 32.

The conveyance vehicle 3 may not have the plate 32. The lower surface of the main body unit 31 is also referred to as the lower surface of the conveyance vehicle 3.

Wheels (not shown) are rotatably provided under the main body unit 31. When an actuator such as a motor rotates the wheels in response to a control signal from the processor, the conveyance vehicle 3 can move to a specified position. The conveyance vehicle 3 may move autonomously based on the detection result of the sensor.

The thickness of the main body unit 31 may be less than a gap between the lower surface of the mounting unit 21 and the abutting parts 221. Alternatively, grooves into which the abutting parts 221 enter may be provided in the lower surface of the main body unit 31. As the conveyance vehicle 3 advances from the distal end to the proximal end of the abutting parts 221, the conveyance vehicle 3 slips under the mounting unit 21. The abutting parts 221 do not interfere with the coupling of the loading platform 2 and the conveyance vehicle 3.

Figure 2:
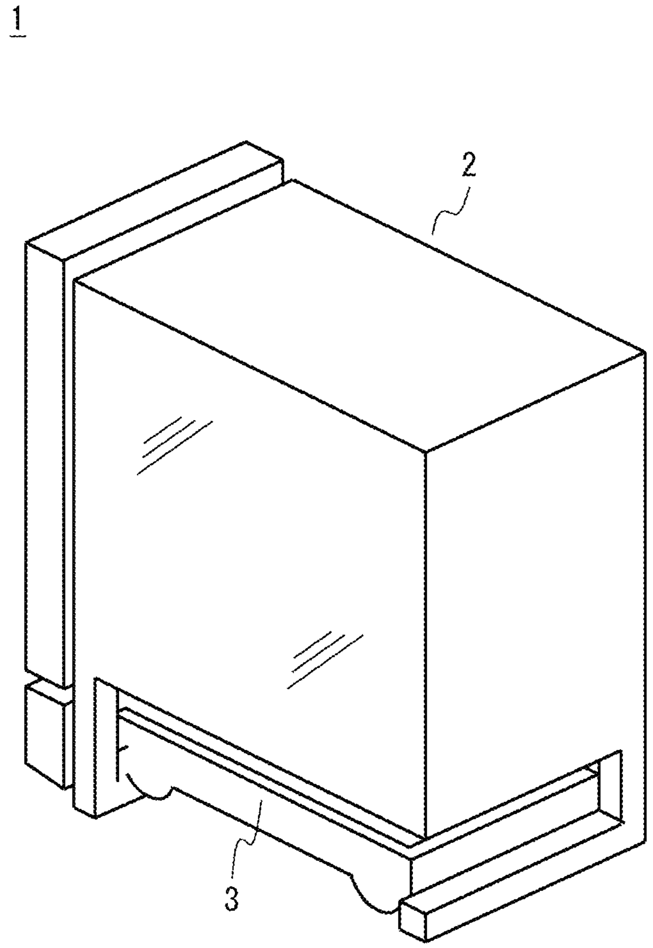
FIG. 2 is a diagram explaining a state in which a conveyance vehicle is coupled to a loading platform according to the first embodiment.

A drive mechanism (not shown) that lifts the loading platform 2 is provided on the upper surface of the main body unit 31. The conveyance vehicle 3 enters a gap between the lower surface of the mounting unit 21 and the abutting parts 221, and the conveyance vehicle 3 lifts the mounting unit 21 from below. As a result, the conveyance vehicle 3 and the loading platform 2 are coupled to each other. FIG. 2 is a diagram for explaining the state in which the conveyance vehicle 3 and the loading platform 2 are coupled. The loading platform 2 is conveyed by the conveyance vehicle 3 in a state in which it is coupled to the conveyance vehicle 3, that is, the mounting unit 21 is lifted from below by the conveyance vehicle 3. When the conveyance vehicle 3 coupled to the loading platform 2 travels, the conveyance system 1 conveys the package.

Returning to FIG. 1, the conveyance vehicle 3 has a processor, memory, and so on, not shown. The processor reads a program, not shown, into a memory, such as RAM, and executes the program. As a result, the wheel and drive mechanism are controlled, the conveyance vehicle 3 is coupled to the loading platform 2, and then the conveyance vehicle 3 conveys the loading platform 2.

When the conveyance vehicle 3 lifts the mounting unit 21, it makes the abutting parts 221 of the loading platform 2 abut the lower surface of the conveyance vehicle 3. Then, the conveyance vehicle 3 conveys the loading platform 2 while the mounting unit 21 is lifted from below. When the loading platform 2 is supported by the conveyance vehicle 3 with the abutting parts 221 interposed therebetween, the risk of the loading platform 2 tipping over is reduced. In addition, the rattling of the loading platform 2 can be suppressed.

When the loading platform 2 has the longitudinal direction and the transverse direction in the top view, the loading platform 2 tends to tip over in the transverse direction. Therefore, when the abutting parts 221 extend in the transverse direction of the loading platform 2, the risk of the loading platform 2 tipping over is easily reduced. In addition, when a plurality of abutting parts 221 abut the lower surface of the main body unit 31, the risk of the loading platform 2 tipping over can be further reduced.

When the cross section of the abutting part 221 is rectangular and the abutting part 221 is arranged so that one side of the rectangle is aligned with the horizontal direction, the contact area between the lower surface of the main body unit 31 and the abutting part 221 is large, and the stability of the loading platform 2 is high.

Figure 3:
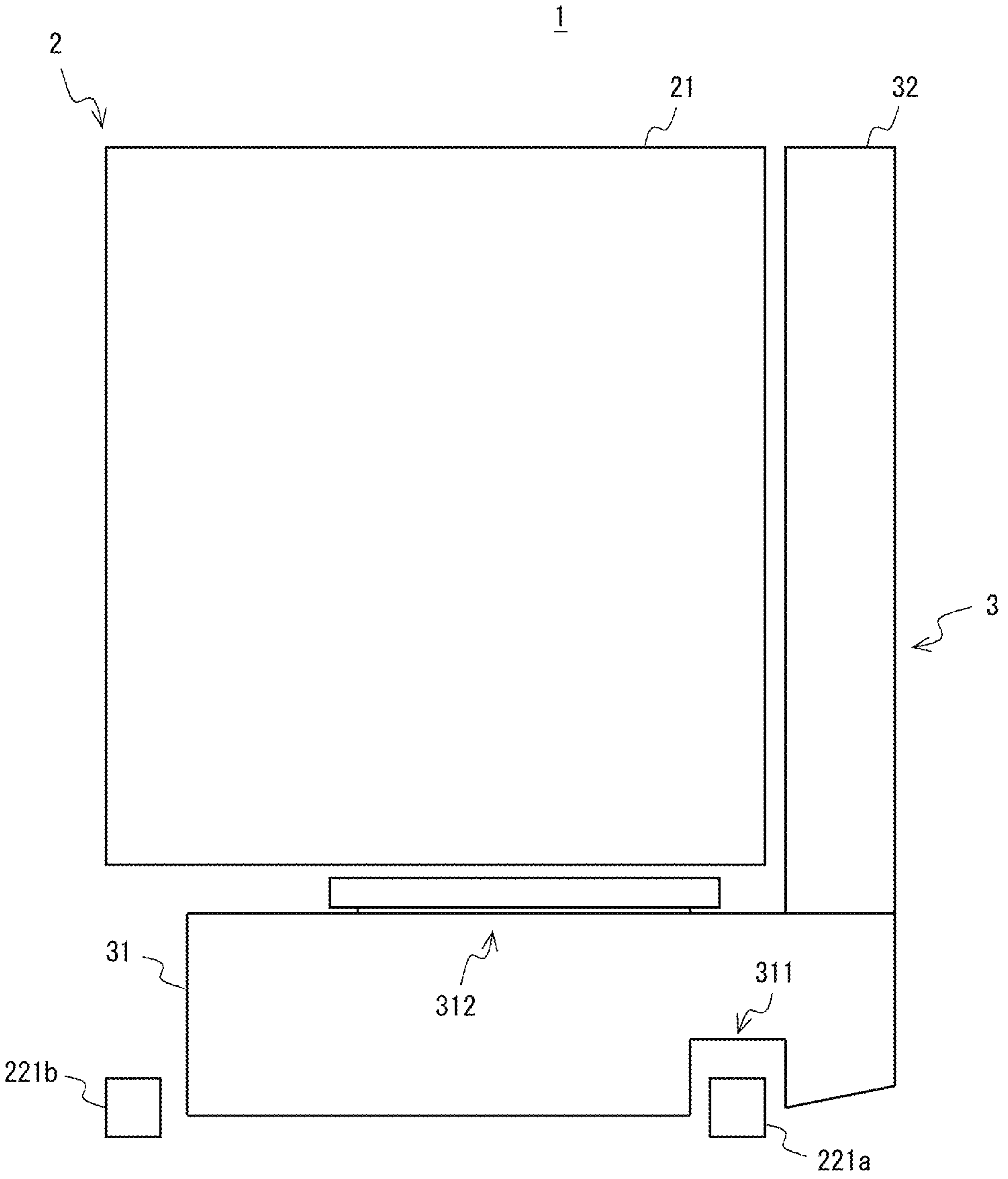
FIG. 3 is a diagram explaining an operation of the conveyance system according to the first embodiment.
Figure 4:
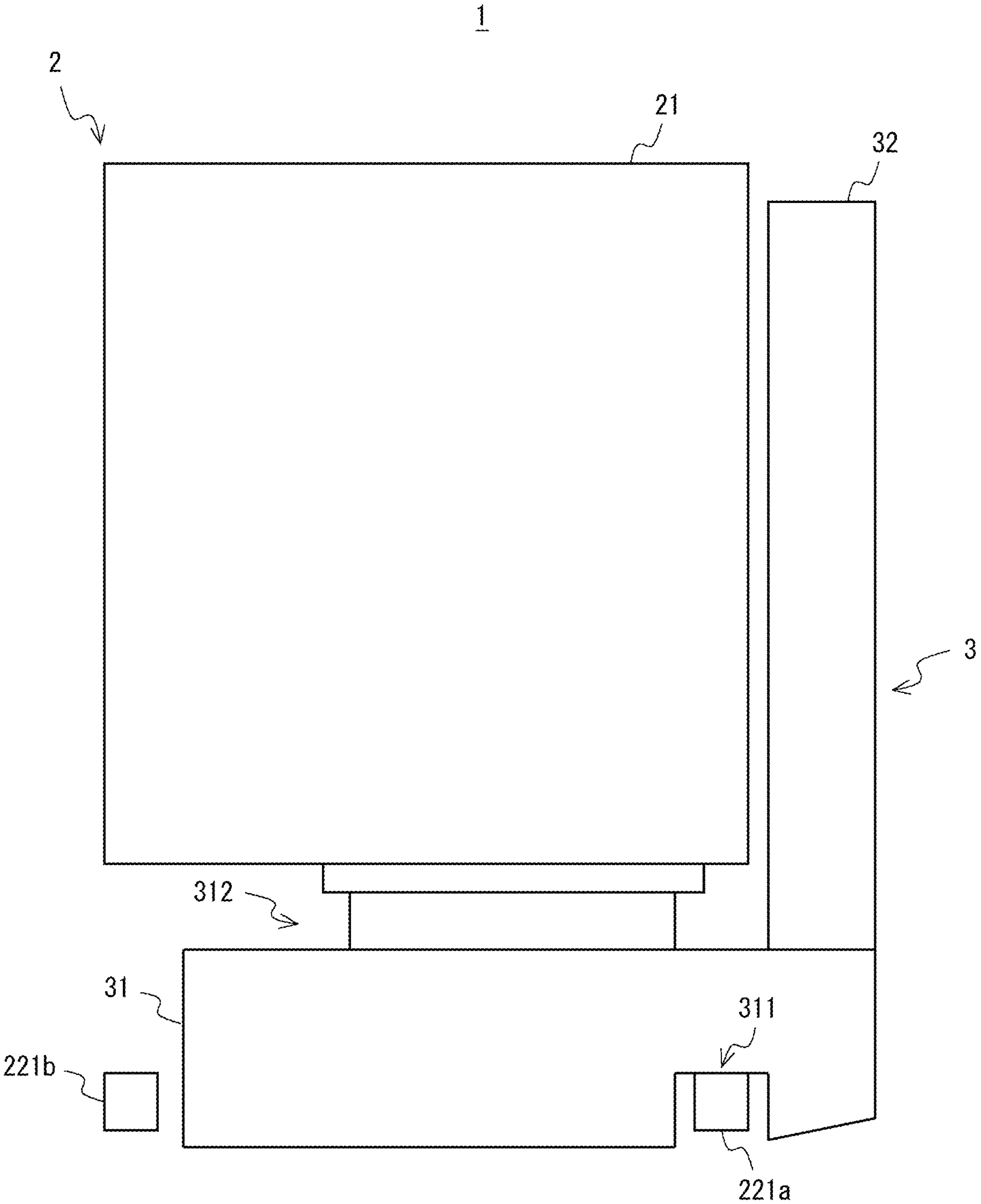
FIG. 4 is a diagram explaining the operation of the conveyance system according to the first embodiment.

Next, the operation of the conveyance system 1 will be described with reference to FIGS. 3 and 4. FIG. 3 shows a state in which the conveyance vehicle 3 moves above the abutting part 221*a*, that is, the conveyance vehicle 3 has slipped under the mounting unit 21. FIG. 4 shows a state in which the conveyance vehicle 3 lifts the mounting unit 21 from below.

Referring to FIG. 3, on the lower surface of the main body unit 31 of the conveyance vehicle 3, a groove 311 into which the rod-shaped abutting part 221*a* or abutting part 221*b* enters. The width of the groove 311 may be set so that the groove 311 fits the abutting part 221. The abutting part 221*a* enters the groove 311 as the conveyance vehicle 3 advances from the distal end to the proximal end of the abutting part 221. Further, the abutting part 221*b* enters the groove 311 as the conveyance vehicle 3 advances from the distal end to the proximal end of the abutting part 221*b*. In FIG. 3, the abutting part 221*a* enters the groove 311. A docking sensor for detecting that the abutting part 221 enters the groove 311 may be provided on the abutting part 221.

A drive mechanism 312 for lifting the mounting unit 21 is provided on the upper surface of the main body unit 31. The drive mechanism 312 may include an actuator. The drive mechanism 312 includes, for example, a vertically expanding and contracting part. A platform abutting the lower surface of the mounting unit 21 may be provided at the distal end of the expanding and contracting part. The lifting position of the mounting unit 21 may be different from that in FIG. 3. For example, the drive mechanism 312 may lift the mounting unit 21 at four corners of the upper surface of the main body unit 31.

Referring to FIG. 4, the mounting unit 21 is lifted from below by the drive mechanism 312. The upper surface of the abutting part 221*a* abuts the lower surface of the main body unit 31 and, more specifically, with the lower surface of the groove 311.

Figure 5:
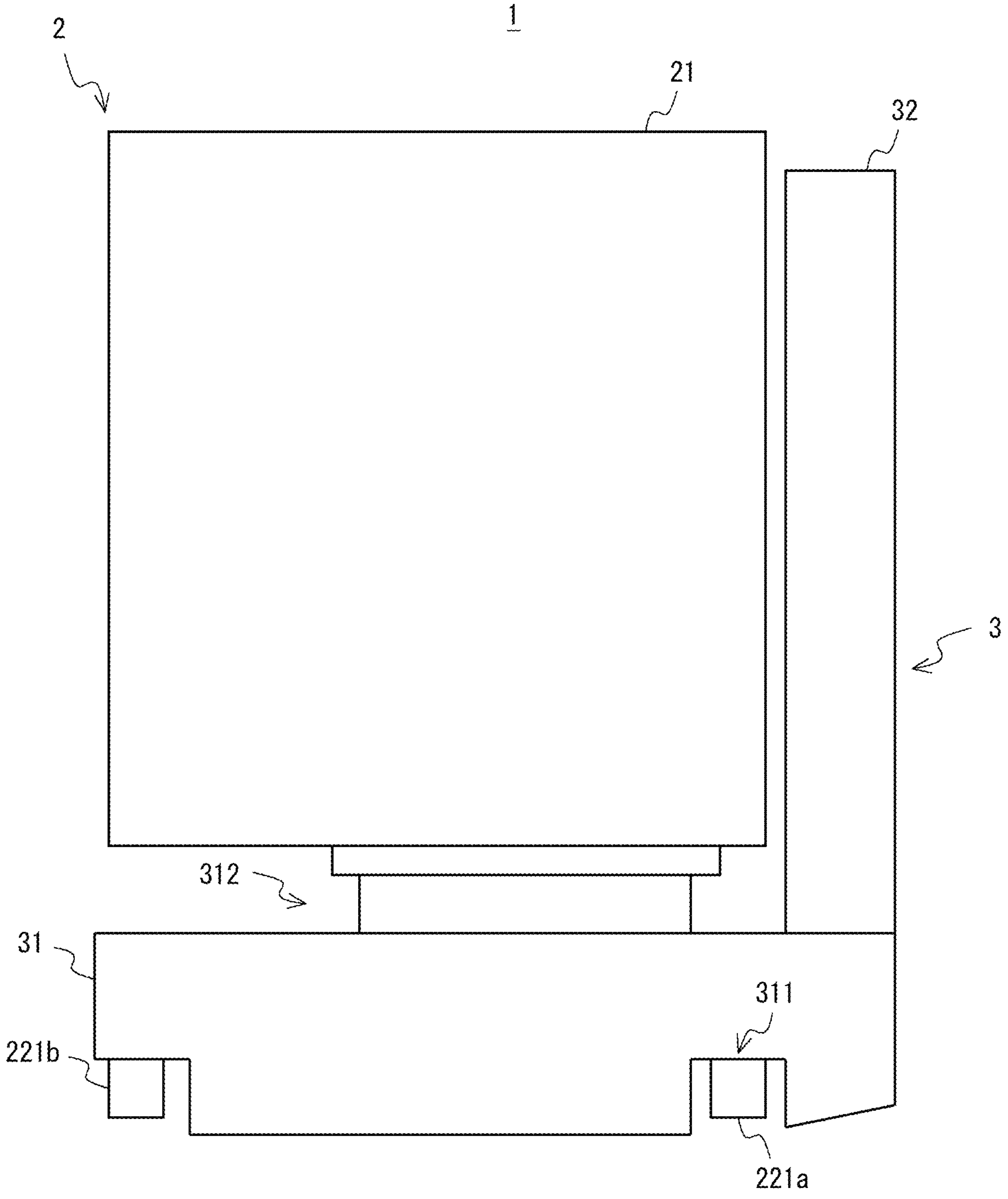
FIG. 5 is a diagram explaining a state in which a plurality of abutting parts according to the first embodiment abut a main body unit.

As shown in FIG. 5, both the abutting part 221*a* and the abutting part 221*b* may abut the lower surface of the main body unit 31. The loading platform 2 can be further stabilized by the plurality of abutting parts 221 abutting the lower surface of the main body unit 31. When the abutting part 221*a* and the abutting part 221*b* abut the periphery (e.g., both sides) of the lower surface of the main body unit 31, the support base surface is wider and more stable.

In this case, the conveyance vehicle 3 needs to be moved above both the abutting part 221*a* and the abutting part 221*b* in advance. For example, if the direction from the proximal end to the distal end of the abutting part 221*a* is the same as the direction from the proximal end to the distal end of the abutting part 221*b*, the conveyance vehicle 3 travels from the distal end to the proximal end of the abutting part 221*a* and the abutting part 221*b*. Thus, the conveyance vehicle 3 can move above both the abutting part 221*a* and abutting part 221*b*.

Note that the direction from the proximal end to the distal end of the abutting part 221*a* may be opposite to the direction from the proximal end to the distal end of the abutting part 221*b*. If the groove 311 is sufficiently wide or the groove 311 is not provided, the conveyance vehicle 3 may move above both the abutting part 221*a* and the abutting part 221*b*, for example, by moving above the abutting part 221*a* and then moving in a direction orthogonal to the direction in which the abutting part 221*a* extends.

In FIG. 5, two abutting parts 221 abut the lower surface of the main body unit 31, and instead three or more abutting parts 221 may abut the lower surface of the main body unit 31. The directions of the three or more abutting part 221 from the proximal end to the distal end may be the same.

The conveyance system according to the first embodiment reduces the risk of a loading platform conveyed by a conveyance vehicle tipping over.

The above-described program includes instructions (or software codes) that, when loaded into a computer, cause the computer to perform one or more of the functions. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

It should be noted that the present disclosure is not limited to the above embodiments and may be modified accordingly to the extent that it does not deviate from the purpose.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance system comprising:

a loading platform including a mounting unit; and a conveyance vehicle, wherein the loading platform is conveyed by the conveyance vehicle while the mounting unit is lifted from below by the conveyance vehicle, and the loading platform has an abutting part below the mounting unit that abuts a lower surface of the conveyance vehicle when the conveyance vehicle lifts the mounting unit, wherein the abutting part has a rod-like or plate-like shape extending in a front-rear direction or width direction of the loading platform, the loading platform includes a pole connecting a proximal end to a periphery of the lower surface of the mounting unit, the proximal end being one end of the abutting part, and when the conveyance vehicle slips under the mounting unit, the conveyance vehicle advances from a distal end of the abutting part toward the proximal end thereof.

2. The conveyance system according to claim 1, wherein the loading platform is configured to have a longitudinal direction and a transverse direction in a top view, and the abutting part extends in the transverse direction among the front-rear direction and the width direction.

3. The conveyance system according to claim 1, wherein when the conveyance vehicle lifts the mounting unit, a plurality of the abutting parts abut the lower surface of the conveyance vehicle.

4. The conveyance system according to claim 1, wherein a groove into which the abutting part enters is provided in the lower surface of the conveyance vehicle.

5. A conveyance system comprising:

a loading platform including a mounting unit; and a conveyance vehicle, wherein the loading platform is conveyed by the conveyance vehicle while the mounting unit is lifted from below by the conveyance vehicle, the loading platform has an abutting part below the mounting unit that abuts a lower surface of the conveyance vehicle when the conveyance vehicle lifts the mounting unit, and when the conveyance vehicle slips under the mounting unit, the conveyance vehicle advances from a distal end of the abutting part toward a proximal end thereof.

6. A conveyance system comprising:

a loading platform including a mounting unit; and a conveyance vehicle, wherein the loading platform is conveyed by the conveyance vehicle while the mounting unit is lifted from below by the conveyance vehicle, and the loading platform has an abutting part below the mounting unit that abuts a lower surface of the conveyance vehicle when the conveyance vehicle lifts the mounting unit, wherein a groove into which the abutting part enters is provided in the lower surface of the conveyance vehicle.

* * * * *